(12) United States Patent
Ishibashi et al.

(10) Patent No.: US 11,776,072 B2
(45) Date of Patent: Oct. 3, 2023

(54) MACHINE LEARNING METHOD, INFORMATION PROCESSING DEVICE, COMPUTER PROGRAM PRODUCT, AND ADDITIVE MANUFACTURING MONITORING SYSTEM

(71) Applicant: Shibaura Machine CO., LTD., Chiyoda-ku (JP)

(72) Inventors: Kentaro Ishibashi, Numazu (JP); Yuta Suzuki, Numazu (JP)

(73) Assignee: Shibaura Machine CO., LTD., Chiyoda-ku (JP)

( * ) Notice: Subject to any disclaimer, the term of this patent is extended or adjusted under 35 U.S.C. 154(b) by 384 days.

(21) Appl. No.: 16/852,846

(22) Filed: Apr. 20, 2020

(65) Prior Publication Data
US 2020/0341432 A1 Oct. 29, 2020

(30) Foreign Application Priority Data

Apr. 25, 2019 (JP) .................................. 2019-084263
Apr. 25, 2019 (JP) .................................. 2019-084304

(51) Int. Cl.
*G06Q 50/04* (2012.01)
*B22F 10/20* (2021.01)
(Continued)

(52) U.S. Cl.
CPC ............. *G06Q 50/04* (2013.01); *B22F 10/20* (2021.01); *B22F 10/25* (2021.01); *B22F 12/90* (2021.01);
(Continued)

(58) Field of Classification Search
CPC ................ G05B 13/027; G05B 13/024; G05B 19/4099; B29C 64/393; B29C 64/153;
(Continued)

(56) References Cited

U.S. PATENT DOCUMENTS 8,924,314 B2 * 12/2014 Kulkarni ............... G06F 16/951
706/12
10,997,500 B1 * 5/2021 Vishnu Narayanan .. G06N 5/04
(Continued)

FOREIGN PATENT DOCUMENTS

JP   09-120455 A   5/1997
JP   2016-502596 A   1/2016
(Continued)

OTHER PUBLICATIONS

Office Action dated Nov. 22, 2022 in corresponding Japanese Patent Application No. 2019-084263.
(Continued)

*Primary Examiner* — Thomas C Lee
*Assistant Examiner* — Anzuman Sharmin
(74) *Attorney, Agent, or Firm* — Oblon, McClelland, Maier & Neustadt, L.L.P.

(57) ABSTRACT

A machine learning method according to an embodiment is a machine learning method performed by a computer and includes the steps of: allowing a calculator to calculate output information from each of items of input information; determining whether the output information is correct or incorrect based on the output information and answer information set for the plurality of pieces of input information; allowing the calculator to calculate the output information from each of at least one first input information, which is included in the plurality of pieces of input information and corresponds to the output information determined to be incorrect, and at least one second input information included in the plurality of pieces of input information; and changing the calculator based on the output information.

11 Claims, 11 Drawing Sheets

(51) Int. Cl.
*B22F 10/25* (2021.01)
*B22F 12/90* (2021.01)
*B29C 64/393* (2017.01)
*B33Y 30/00* (2015.01)
*B33Y 50/02* (2015.01)
*G05B 13/02* (2006.01)
*G06F 18/214* (2023.01)
*G06F 18/21* (2023.01)
*G06N 3/084* (2023.01)
*G06V 10/764* (2022.01)
*G06V 10/774* (2022.01)
*G06V 10/776* (2022.01)
*G06V 10/82* (2022.01)
*B22F 12/37* (2021.01)
*B22F 12/53* (2021.01)
*B22F 10/322* (2021.01)

(52) U.S. Cl.
CPC ............ *B29C 64/393* (2017.08); *B33Y 30/00* (2014.12); *B33Y 50/02* (2014.12); *G05B 13/024* (2013.01); *G05B 13/027* (2013.01); *G06F 18/214* (2023.01); *G06F 18/217* (2023.01); *G06N 3/084* (2013.01); *G06V 10/764* (2022.01); *G06V 10/774* (2022.01); *G06V 10/776* (2022.01); *G06V 10/82* (2022.01); *B22F 10/322* (2021.01); *B22F 12/37* (2021.01); *B22F 12/53* (2021.01); *G06V 2201/06* (2022.01)

(58) Field of Classification Search
CPC ......... B33Y 30/00; B33Y 50/02; B33Y 10/00; G06K 9/6256; G06K 9/6262; G06K 9/6273; G06N 3/084; G06N 3/0454; G06Q 50/04; G06V 2201/06; G06V 10/82; G06F 2113/10; G06F 30/27; Y02P 10/25; Y02P 90/30; B22F 10/20; B22F 10/25; B22F 10/30; B22F 12/53; B22F 12/90

See application file for complete search history.

(56) References Cited

U.S. PATENT DOCUMENTS

| | | | |
|---|---|---|---|
| 11,045,905 B2* | 6/2021 | Wasynczuk | C23C 18/50 |
| 11,189,021 B2* | 11/2021 | Shah | G06T 7/60 |
| 2017/0087634 A1* | 3/2017 | Beacham, Jr. | B22F 10/28 |
| 2018/0253645 A1 | 9/2018 | Burr | |
| 2018/0253647 A1* | 9/2018 | Yu | G06F 18/2413 |
| 2019/0210159 A1 | 7/2019 | Endoh et al. | |
| 2019/0295000 A1* | 9/2019 | Candel | G06N 5/003 |
| 2019/0370683 A1* | 12/2019 | Metzen | G06N 20/00 |
| 2020/0019884 A1* | 1/2020 | McCourt, Jr. | G06F 17/18 |
| 2020/0244816 A1* | 7/2020 | Ukita | G06N 3/088 |
| 2020/0311550 A1* | 10/2020 | Hu | G06F 3/04842 |
| 2021/0031454 A1* | 2/2021 | Kothari | G06F 3/1204 |
| 2022/0101127 A1* | 3/2022 | Torras | G06V 10/774 |

FOREIGN PATENT DOCUMENTS

| | | | |
|---|---|---|---|
| JP | 2017-160482 A | | 9/2017 |
| JP | 2018-1184 A | | 1/2018 |
| JP | 2018-035429 A | | 3/2018 |
| JP | 2018-145526 A | | 9/2018 |
| JP | 7054268 B2 | * | 3/2019 |
| JP | 2019117105 A | * | 7/2019 |
| WO | WO 2016/075802 A1 | | 5/2016 |
| WO | WO 2018/212193 A1 | | 11/2018 |
| WO | WO 2019/065605 A1 | | 4/2019 |

OTHER PUBLICATIONS

Japanese Decision to Grant Patent dated Jan. 24, 2023, in Japanese Patent Application No. 2019-084304, 4 pages (with English Translation).

* cited by examiner

MACHINE LEARNING METHOD, INFORMATION PROCESSING DEVICE, COMPUTER PROGRAM PRODUCT, AND ADDITIVE MANUFACTURING MONITORING SYSTEM

CROSS-REFERENCE TO RELATED APPLICATIONS

This application is based upon and claims the benefit of priority from Japanese Patent Applications No. 2019-084263 and No. 2019-084304, both filed on Apr. 25, 2019, the entire contents of all of which are incorporated herein by reference.

FIELD

Embodiments described herein relate generally to a machine learning method, an information processing device, a computer program product, and an additive manufacturing monitoring system.

BACKGROUND

In the fields of image recognition, voice or speech recognition, and natural language processing, for example, machine learning is applied. Machine learning can improve in computation accuracy by, for example, repeatedly comparing between a result of calculation from training data and a label corresponding to the training data.

SUMMARY

According to one embodiment, a machine learning method includes: causing a calculator to calculate output information from each of items of input information; determining on the basis of the output information and answer information whether the output information is correct or incorrect, the answer information being set to each of the items of input information; causing the calculator to calculate the output information from each of first input information and second input information, the first input information and the second input information being included in the items of input information, the first input information corresponding to the output information determined to be incorrect; and changing the calculator based on the output information.

DETAILED DESCRIPTION

First Embodiment

Hereinafter, a first embodiment will be described with reference to FIG. 1 to FIG. 11. Note that, in the present specification, basically, a vertically upward direction is defined as an upward direction and a vertically downward direction is defined as a downward direction. Furthermore, in the present specification, components according to the embodiment and a description of the components are described in a plurality of expressions in some cases. The components and the description thereof are examples and are not limited by the expressions of the present specification. The components may be specified by names different from those in the present specification. Furthermore, the components may be described by expressions different from those in the present specification.

Figure 1:
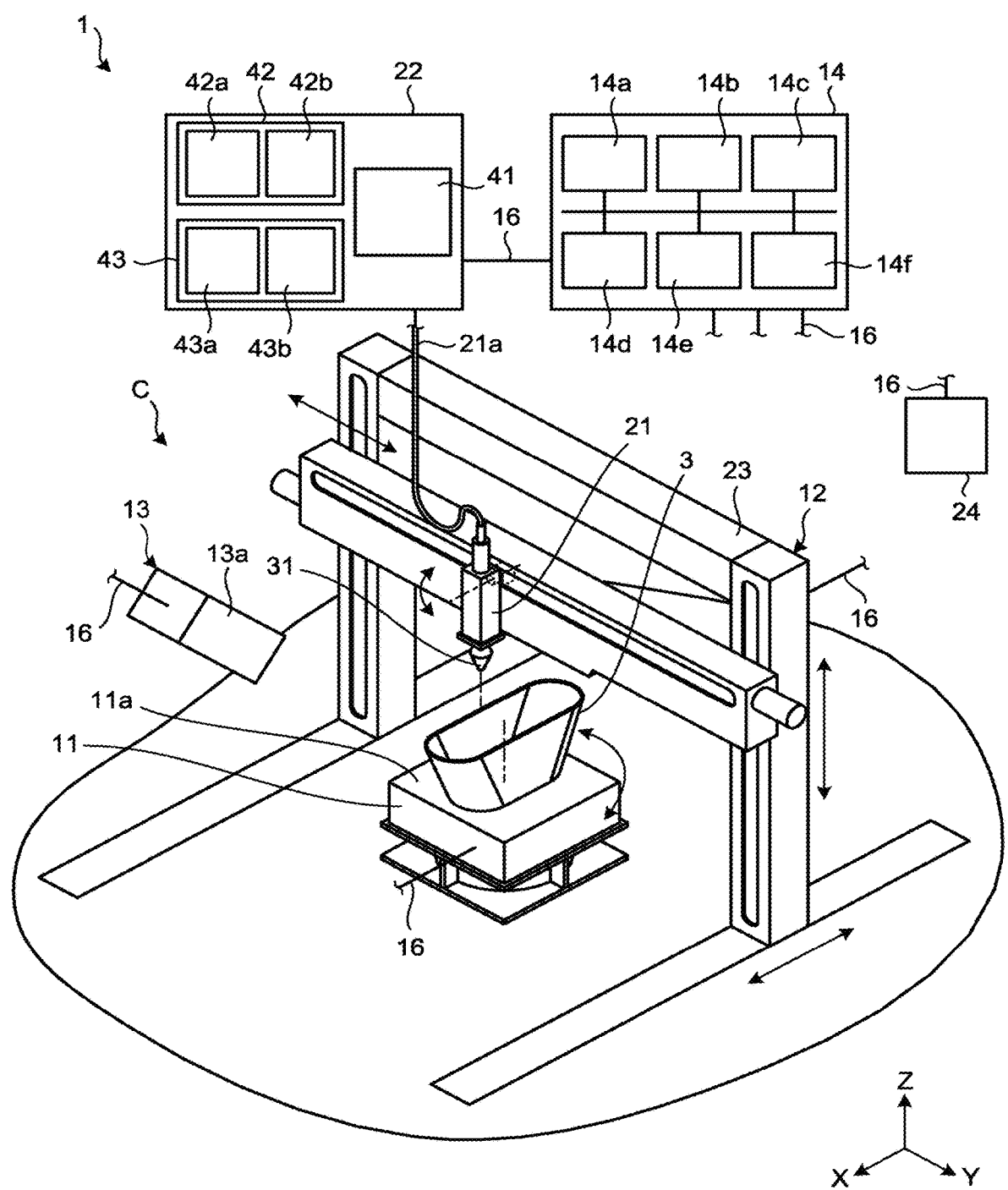
FIG. 1 is an exemplary perspective view schematically illustrating an additive manufacturing system according to a first embodiment.

FIG. 1 is an exemplary perspective view schematically illustrating an additive manufacturing system 1 according to the first embodiment. The additive manufacturing system 1 may also be referred to as an additive manufacturing monitoring system. The additive manufacturing system 1 includes a laser material deposition, three-dimensional printer. The additive manufacturing system 1 is not limited to this example.

As illustrated in each drawing, an X axis, a Y axis, and a Z axis are defined in the present specification. The X axis, the Y axis, and the Z axis are orthogonal to one another. The Z axis extends in a vertical direction, for example. The X axis and the Y axis extend in a horizontal direction, for example. The additive manufacturing system 1 may be disposed such that the Z axis obliquely intersects with the vertical direction.

Figure 2:
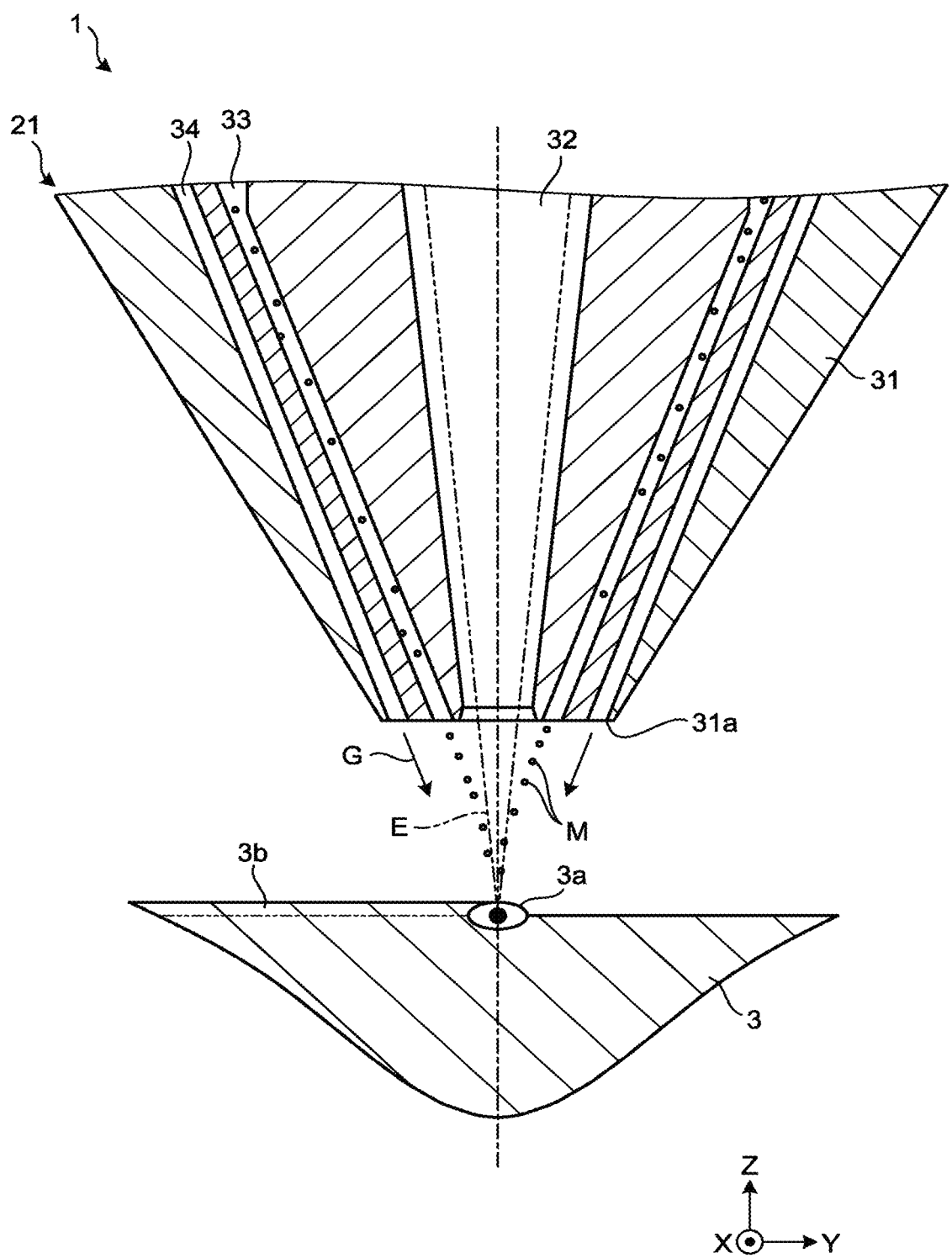
FIG. 2 is an exemplary sectional view schematically illustrating a part of the additive manufacturing system and an object in the first embodiment.

FIG. 2 is an exemplary sectional view schematically illustrating a part of the additive manufacturing system 1 and an object 3 in the first embodiment. The additive manufacturing system 1 additively manufactures the object 3 having a given shape by, for example, adding a layer upon a layer of a powdered material M. The object 3 is an example of an object to be additively manufactured.

As illustrated in FIG. 1, the additive manufacturing system 1 includes a table 11, a manufacturing unit 12, an imager 13, a control unit 14, and a plurality of signal lines 16. The control unit 14 may also be referred to as an information processing device or a computer. The table 11, the manufacturing unit 12, the imager 13, and the control unit 14 are disposed, for example, in a chamber C inside a housing of the additive manufacturing system 1 or inside a manufacturing room. The chamber C is a sealable space, for example.

The table 11 has a support surface 11a. The support surface 11a has a substantially flat shape and faces the positive direction of the Z axis (direction indicated by the arrow of the Z axis, the upward direction). The support surface 11a supports an additive manufactured object 3, an object 3 being manufactured, and a base onto which the material M is added. In the following description, the object 3 includes the additive manufactured object 3, the object 3 in progress, and the base. The table 11 can partially rotate to rotate the object 3 supported by the support surface 11a around a rotational center parallel to the Z axis.

The table 11 may move the object 3 in the X axis direction, the Y axis direction, and the Z axis direction. Furthermore, the table 11 may further rotate the object 3 around a rotational center parallel to the Y axis or parallel to the X axis.

The manufacturing unit 12 supplies and laminates the material M on the support surface 11a or the base supported by the support surface 11a. The material M is powdered titanium, for example. The material M is not limited thereto and may be other materials such as other metals, synthetic resins, and ceramics. The additive manufacturing system 1 may additively manufacture the object 3 from different materials M.

The manufacturing unit 12 includes a nozzle 21, a supply device 22, a moving device 23, and an adjusting device 24. The nozzle 21 discharges the material M to the support surface 11a of the table 11 or the object 3 on the support surface 11a. As illustrated in FIG. 2, the nozzle 21 emits an energy ray E to the discharged material M and the object 3 on the support surface 11a. The energy ray E is a laser beam, for example.

The nozzle 21 emits a laser beam as the energy ray E and supplies the material M in parallel. The energy ray E is not limited to the laser beam. The nozzle 21 may emit another energy ray E. The energy ray E may be optionally set as long as it can melt or sinter the material M as the laser beam, or may be an electronic beam, or an electromagnetic wave in a microwave to ultraviolet range, for example.

The manufacturing unit 12 heats the base and the discharged material M with the energy ray E to form a molten region (bead) 3a. The nozzle 21 emits the energy ray E to the material M and melts or sinters the material M, thereby aggregating the material M in the molten region 3a. Thus, the molten region 3a may include not only the supplied material M but also a part of the base and the object 3 irradiated with the energy ray E. The molten region 3a may include not only the completely melted material M but also a combination of partially melted materials M.

The molten region 3a is solidified, thereby forming a layer 3b on the base or the object 3 as an aggregate of the material M in a layer or thin film form. The material M may be cooled, transferring heat to the aggregate of the material M, and laminated in a granular form to be a granular aggregate or layer.

The manufacturing unit 12 may subject the aggregate of the material M to an annealing process by emitting the energy ray E from the nozzle 21. The aggregate of the material M is repeatedly melted or sintered with the energy ray E, and is solidified to become the layer 3b.

The manufacturing unit 12 repeatedly adds the layers 3b to additively manufacture the object 3. That is, the nozzle 21 of the manufacturing unit 12 emits the energy ray E to the material M, melts or sinters the material M to form the layer 3b, and repeatedly forms the layers 3b, thereby additively manufacturing the object 3 on the support surface 11a.

The nozzle 21 has a nozzle head 31. A tip end 31a of the nozzle head 31 faces the object 3 with an interval. The nozzle head 31 is provided with an optical path 32, a discharge path 33, and a supply path 34. The optical path 32, the discharge path 33, and the supply path 34 are open to the tip end 31a, for example.

The optical path 32 is a hole having a substantially circular cross section. The energy ray E is emitted to the outside of the nozzle head 31 through the optical path 32. The discharge path 33 is a hole having a substantially annular cross section and surrounds the optical path 32. Carrier gas and the material M are discharged to the outside of the nozzle head 31 through the discharge path 33. The supply path 34 is a hole having a substantially annular cross section and surrounds the discharge path 33. Shield gas G is discharged to the outside of the nozzle head 31 through the supply path 34. The shield gas G is, for example, an inert gas such as nitrogen or argon.

As illustrated in FIG. 1, the supply device 22 includes an optical device 41, a material supply device 42, and a gas supply device 43. The optical device 41 includes a light source and an optical system, for example. The light source includes an oscillation element, and emits the laser beam as the energy ray E by the oscillation of the oscillation element. The light source can change the output (power) of the energy ray E to emit.

The light source emits and allows the energy ray E to be incident on the optical system. The energy ray E enters the nozzle 21 via the optical system. The optical system can change the focal diameter of the energy ray E. The optical device 41 supplies the energy ray E to the optical path 32 of the nozzle 21 and emits the energy ray E from the optical path 32.

The nozzle 21 can heat the discharged material M by the irradiation of the energy ray E to form the layer 3b of the material M and subjects the material M to an anneal process. The nozzle 21 can irradiate the object 3 with the energy ray E to remove an unnecessary portion of the object 3.

The material supply device 42 includes a material supply unit 42a and a tank 42b. The tank 42b stores therein the material M. The material supply device 42 may include a plurality of tanks 42b that store therein different materials M.

The material supply unit 42a supplies the material M from the tank 42b to the nozzle 21 via a supply pipe 21a. The material supply unit 42a supplies the material M to the nozzle 21 with the carrier gas, for example. The carrier gas is, for example, an inert gas such as nitrogen or argon.

The material supply unit 42a supplies the carrier gas and the material M to the discharge path 33 of the nozzle head 31 via the supply pipe 21a. In this way, the nozzle 21 discharges the carrier gas and the material M from the discharge path 33. The material supply unit 42a can change the amount and speed of discharge of the material M from the nozzle 21 per unit time.

The material supply unit 42a includes, for example, a tank that stores therein the carrier gas, a compressor that allows the carrier gas in the tank to flow to the supply pipe 21a, and a device that supplies the material M in the tank 42b to the flow of the carrier gas. Note that the material supply unit 42a may supply the material M to the nozzle 21 by other means.

The gas supply device 43 includes a gas supply unit 43a and a tank 43b. The tank 43b stores therein the shield gas G. The gas supply unit 43a supplies the shield gas G in the tank 43b to the nozzle 21 via the supply pipe 21a. The supply pipe 21a includes a pipe through which the carrier gas and the material M pass, a pipe through which the shield gas G passes, and a cable through which the energy ray E passes. The gas supply unit 43a can change the amount of the shield gas G discharged from the nozzle 21 per unit time and the speed of the shield gas G discharged.

The moving device 23 moves and rotates the nozzle 21. For example, the moving device 23 can move the nozzle 21 in parallel in the X axis direction, the Y axis direction, and the Z axis direction and rotate the nozzle 21 around the rotation center parallel the X axis.

The moving device 23 can change the direction of the nozzle 21 by moving the nozzle 21 relatively to the support surface 11a. The moving device 23 can change the moving speed of the nozzle 21 with respect to the support surface 11a. Note that the table 11 moves and rotates, so that the nozzle 21 may move relatively to the support surface 11a and the direction of the nozzle 21 with respect to the support surface 11a may be changed.

The adjusting device 24 adjusts oxygen concentration in the chamber C. For example, the adjusting device 24 discharges air from the chamber C or supplies the inert gas to the chamber C, thereby adjusting oxygen concentration around the nozzle 21 and the object 3.

The imager 13 has an imaging device 13a. The imaging device 13a is, for example, a video camera capable of capturing a moving image and transmitting the moving image to the control unit 14. Note that the imaging device 13a may be another imaging device such as a still camera capable of capturing a still image. The imaging device 13a generates images of the nozzle 21 and the object 3. The imaging device 13a is movable, following the nozzle 21.

The control unit 14 is electrically connected to the table 11, the manufacturing unit 12, and the imaging device 13a via the signal lines 16. The control unit 14 may be, for example, a control unit provided integrally with the manufacturing unit 12 or a computer provided separately from the manufacturing unit 12.

The control unit 14 includes, for example, a control device such as a central processing unit (CPU) 14a, a read-only memory (ROM) 14b, a random-access memory (RAM) 14c, an external storage device 14d, an output device 14e, and an input device 14f, and has a hardware configuration using a normal computer. The CPU 14a, the ROM 14b, the RAM 14c, the external storage device 14d, the output device 14e, and the input device 14f are connected to one another via a bus or an interface.

The CPU 14a executes a computer program non-temporarily incorporated in the ROM 14b or the external storage device 14d, so that the control unit 14 controls each unit of the additive manufacturing system 1. For example, the control unit 14 controls the table 11, the nozzle 21 of the manufacturing unit 12, the moving device 23, the adjusting device 24, the optical device 41, the material supply device 42, and the gas supply device 43.

The ROM 14b stores therein the computer program and data required for executing the computer program. The RAM 14c serves as a working area when the computer program is executed. The external storage device 14d is, for example, a device capable of storing, changing, and deleting data, such as a hard disk drive (HDD) and a solid state drive (SSD). The output device 14e is a display or a speaker, for example. The input device 14f is a keyboard or a mouse, for example.

Figure 3:
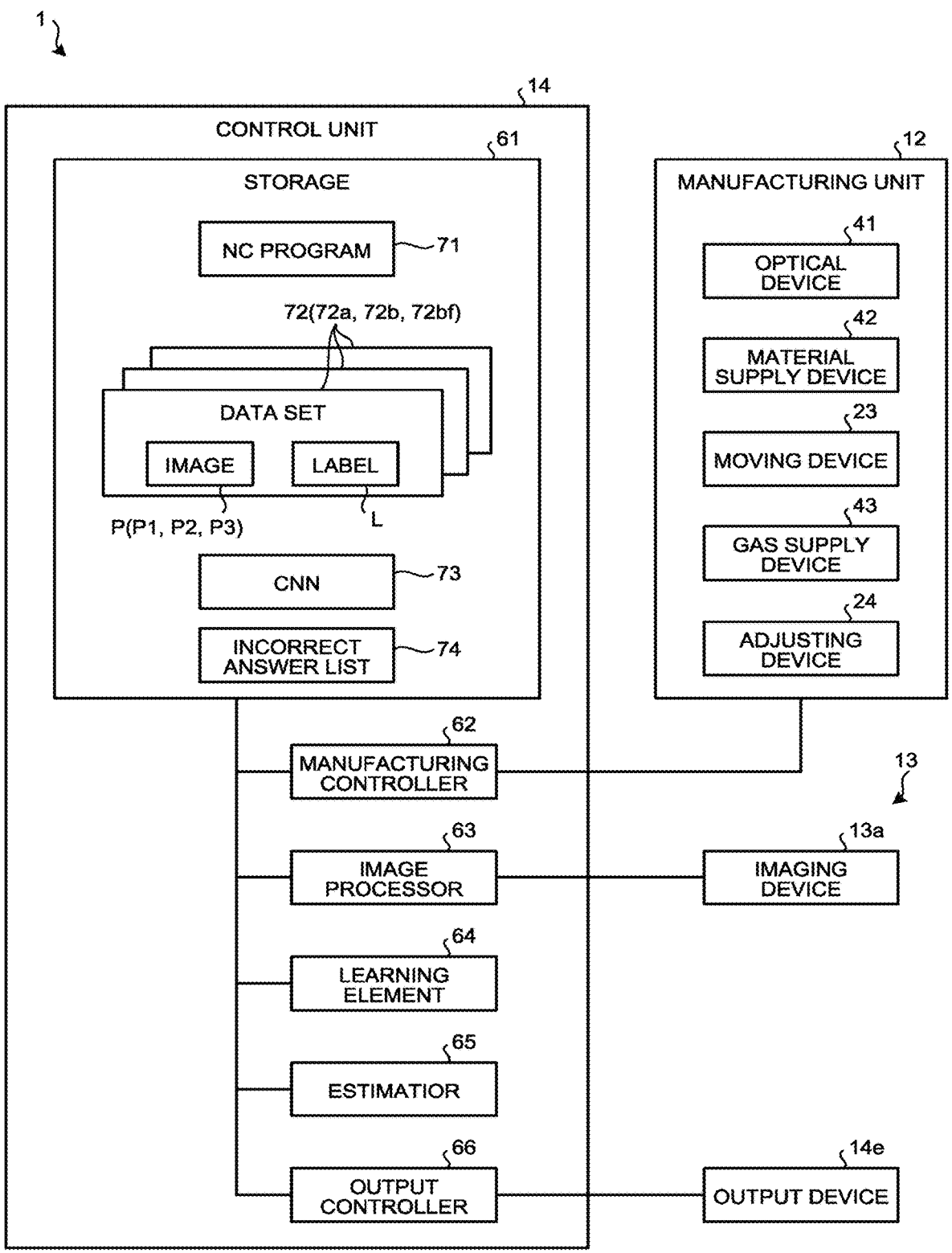
FIG. 3 is an exemplary block diagram functionally illustrating the configuration of the additive manufacturing system of the first embodiment.

FIG. 3 is an exemplary block diagram functionally illustrating the configuration of the additive manufacturing system 1 of the first embodiment. The control unit 14 implements each unit illustrated in FIG. 3 by, for example, the CPU 14a that reads and executes the computer program stored in the ROM 14b or the external storage device 14d. As illustrated in FIG. 3, the control unit 14 includes, for example, a storage 61, a manufacturing controller 62, an image processor 63, a learning element 64, an estimator 65, and an output controller 66.

For example, the CPU 14a serves as the manufacturing controller 62, the image processor 63, the learning element 64, the estimator 65, and the output controller 66. Furthermore, the RAM 14c and the external storage device 14d serve as the storage 61.

The storage 61 stores therein various pieces of information including an NC program 71, a plurality of data sets 72, a convolutional neural network (CNN) 73, and an incorrect answer list 74. The CNN 73 may also be referred to as a calculator or a learning result.

The NC program 71 is information for forming a plurality of layers 3b and the object 3 including the layers 3b. The NC program 71 includes, for example, information on the shapes of the object 3 and the layers 3b, the movement path of the nozzle 21, and additive manufacturing parameters at each position on the movement path. The additive manufacturing parameters include, for example, the moving speed of the nozzle 21, the direction of the nozzle 21, the discharge amount of the material M per unit time, the discharge speed of the material M, the output of the energy ray E to emit, and the flow rate of the shield gas G to supply. The NC program 71 may further include other types of information.

The manufacturing controller 62 controls the manufacturing unit 12 including the moving device 23, the adjusting device 24, the optical device 41, the material supply device 42, and the gas supply device 43 based on the NC program 71, and adds the plurality of layers 3b (object 3). Furthermore, the manufacturing controller 62 can change the additive manufacturing parameters for the manufacturing unit 12 and stop the manufacturing unit 12.

The image processor 63 acquires the moving image generated by the imaging device 13a and converts the moving image into a plurality of still images (images). For example, when the imaging device 13a generates a moving image of 30 fps, the image processor 63 can generate 30 still images from the moving image per second.

The nozzle 21 and the object 3 appear in the image generated by the image processor 63. The image generated by the image processor 63 may also be referred to as a first image, a second image, or input information. The image processor 63 serves as the imager 13 that generates an image together with the imaging device 13a. Note that the imager 13 is not limited to this example and, for example, the imaging device 13a may generate an image by itself.

The learning element 64 performs machine learning based on the data sets 72 stored in the storage 61, and generates the CNN 73 as a learning result. Based on the image generated by the imager 13 and the CNN 73, the estimator 65 estimates appearance or non-appearance of sparks in the image.

The output controller 66 controls the output device 14e. For example, the output controller 66 allows the output device 14e to display the result of the machine learning performed by the learning element 64 and a result of the estimation by the estimator 65.

Hereinafter, the machine learning performed by the learning element 64 will be described in detail. The data sets 72, the CNN 73, and the incorrect answer list 74 stored in the storage 61 are used for the learning element 64 to learning. For example, the storage 61 stores therein hundreds to tens of thousands of data sets 72.

Each of the data sets 72 includes an image P and a label L. The image P may also be referred to as the first image or the input information. The label L may also be referred to as spark information or answer information. That is, the storage 61 stores therein a plurality of images P and a plurality of labels L corresponding to the images P.

Figure 4:
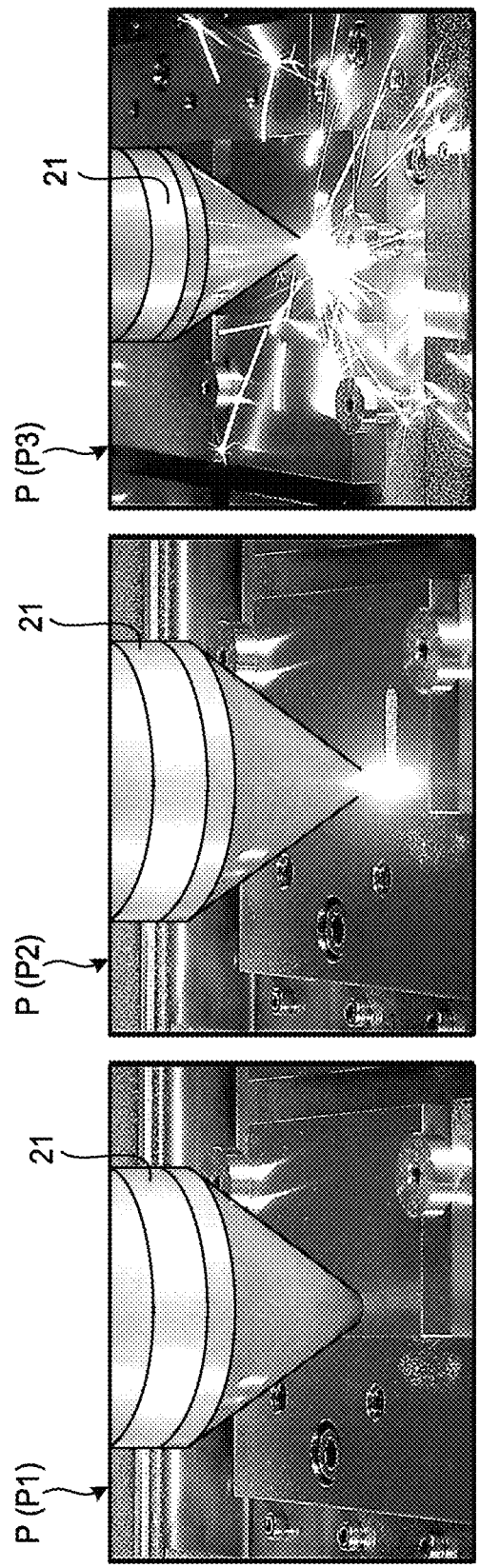
FIG. 4 is a diagram illustrating three examples of an image in the first embodiment.

FIG. 4 is a diagram illustrating three examples of the images P in the first embodiment. As illustrated in FIG. 4, the nozzle 21 appears in the images P. The images P may be generated by the imager 13 or by another device.

The plurality of images P include a non-manufacturing image P1 on the left side, a normal manufacturing image P2 in the center, and an non-normal manufacturing image P3 on the right side in FIG. 4. Note that these images are named for the sake of convenience. The nozzle 21 appearing in the normal manufacturing image P2 does not signify that the nozzle 21 normally operates for additive manufacturing, and the nozzle 21 appearing in the non-normal manufacturing image P3 does not signify that the nozzle 21 non-normally operates for additive manufacturing.

The non-manufacturing image P1 shows the nozzle 21 that performs no additive manufacturing. The nozzle 21 stops discharging the material M and emitting the energy ray E.

The normal manufacturing image P2 and the non-normal manufacturing image P3 show the nozzle 21 that performs the additive manufacturing. The nozzle 21 discharges the material M and emits the energy ray E. Note that the nozzle 21 shown in the normal manufacturing image P2 and the non-normal manufacturing image P3 may emit the energy ray E and stop discharging the material M.

The non-normal manufacturing image P3 shows sparks. For example, in the case of oxidization of titanium as the material M, sparks appear in the non-normal manufacturing image P3. Oxidization of the material M may cause the object 3 to be fragile. On the other hand, in the normal manufacturing image P2, the energy ray E and the molten or sintered material M generate light, but no sparks occur.

The label L is set in advance to the images P according to the states or features of the images P. The label L is a matrix expressed as $[l_0, l_1, l_2]$. Different labels L are set to the non-manufacturing image P1, the normal manufacturing image P2, and the non-normal manufacturing image P3.

For example, the label L corresponding to the non-manufacturing image P1 is set to [1, 0, 0]. The label L corresponding to the normal manufacturing image P2 is set to [0, 1, 0]. The label L corresponding to the non-normal manufacturing image P3 is set to [0, 0, 1]. As above, $l_2$ of the label L indicates whether sparks appear in the images P. Note that the label L is not limited to this example.

Figure 5:
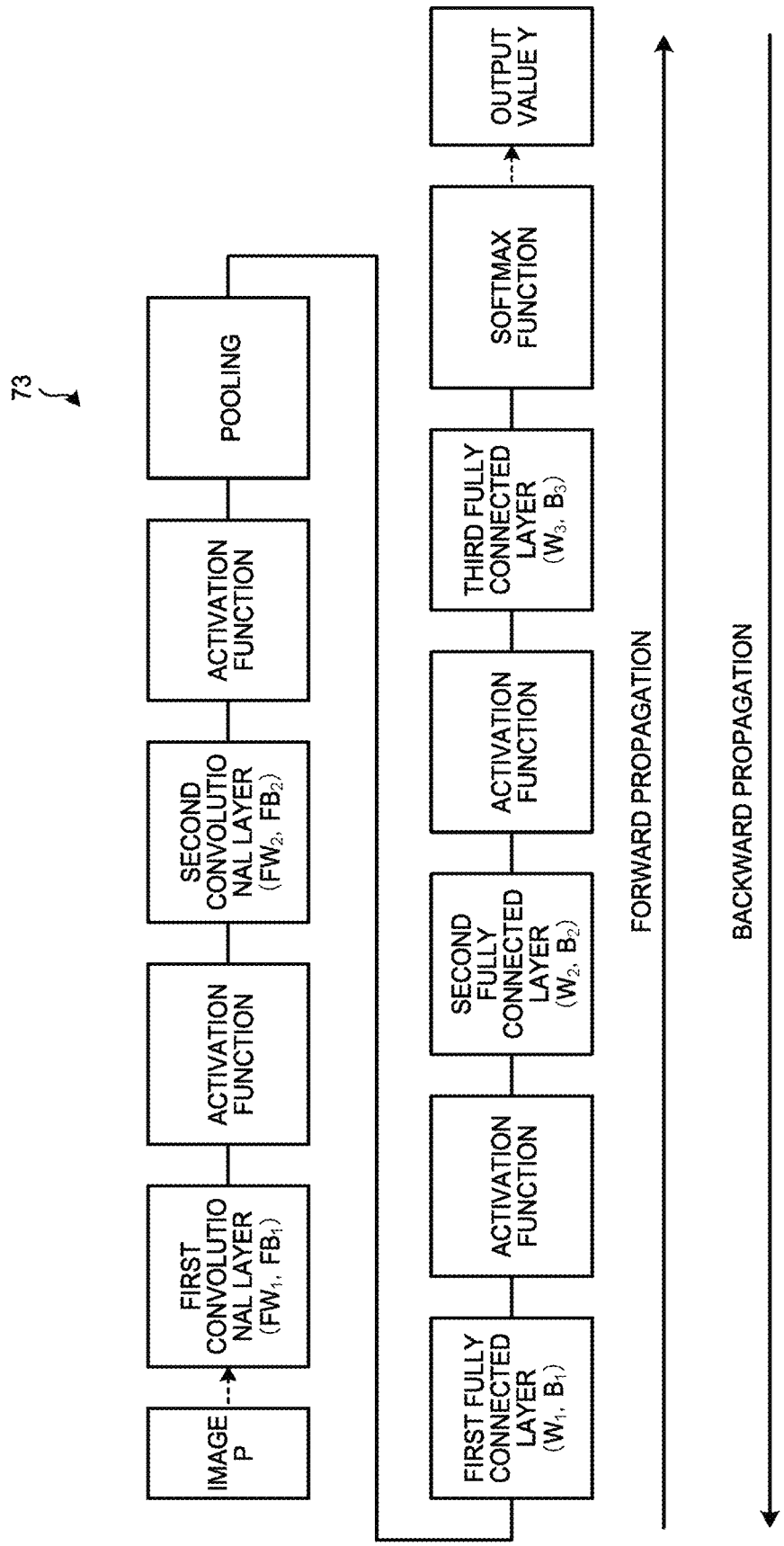
FIG. 5 is an exemplary diagram schematically illustrating an example of the configuration of CNN in the first embodiment.

FIG. 5 is an exemplary diagram schematically illustrating an example of the configuration of the CNN 73 of the first embodiment. In the example of FIG. 5, the CNN 73 is composed of a total of 11 layers obtained by combining five types of layers: a convolutional layer, an activation function, a pooling, a fully connected, and a softmax function.

In the example of FIG. 5, the CNN 73 includes two convolutional layers and three fully connected layers. The convolutional layer has matrices $[FW_1, FB_1]$ and $[FW_2, FB_2]$. The fully connected layer has matrices $[W_1, B_1]$, $[W_2, B_2]$, and $[W_3, B_3]$. Hereinafter, the matrices $[FW_1, FB_1]$, $[FW_2, FB_2]$, $[W_1, B_1]$, $[W_2, B_2]$, and $[W_3, B_3]$ are referred to as network models.

Forward propagation refers to a calculation from input to output. The input represents the images P, for example. The output represents a result (output value) Y calculated by the CNN 73. The output value Y of the forward propagation is a matrix expressed as $[y_0, y_1, y_2]$. That is, the CNN 73 calculates the output value Y from the images P by forward propagation. The output value Y may also be referred to as output information.

Backward propagation refers to a calculation from output to input. The difference between the output value Y calculated via the softmax function and the label L is a gradient value. By transmitting the gradient value from the output to the input, the CNN 73 calculates the gradient value of each layer.

The above CNN 73 is exemplary and may have another configuration. Furthermore, the additive manufacturing system 1 may have another neutral network different from the CNN 73 or another learning model of deep learning (machine learning).

Figure 6:
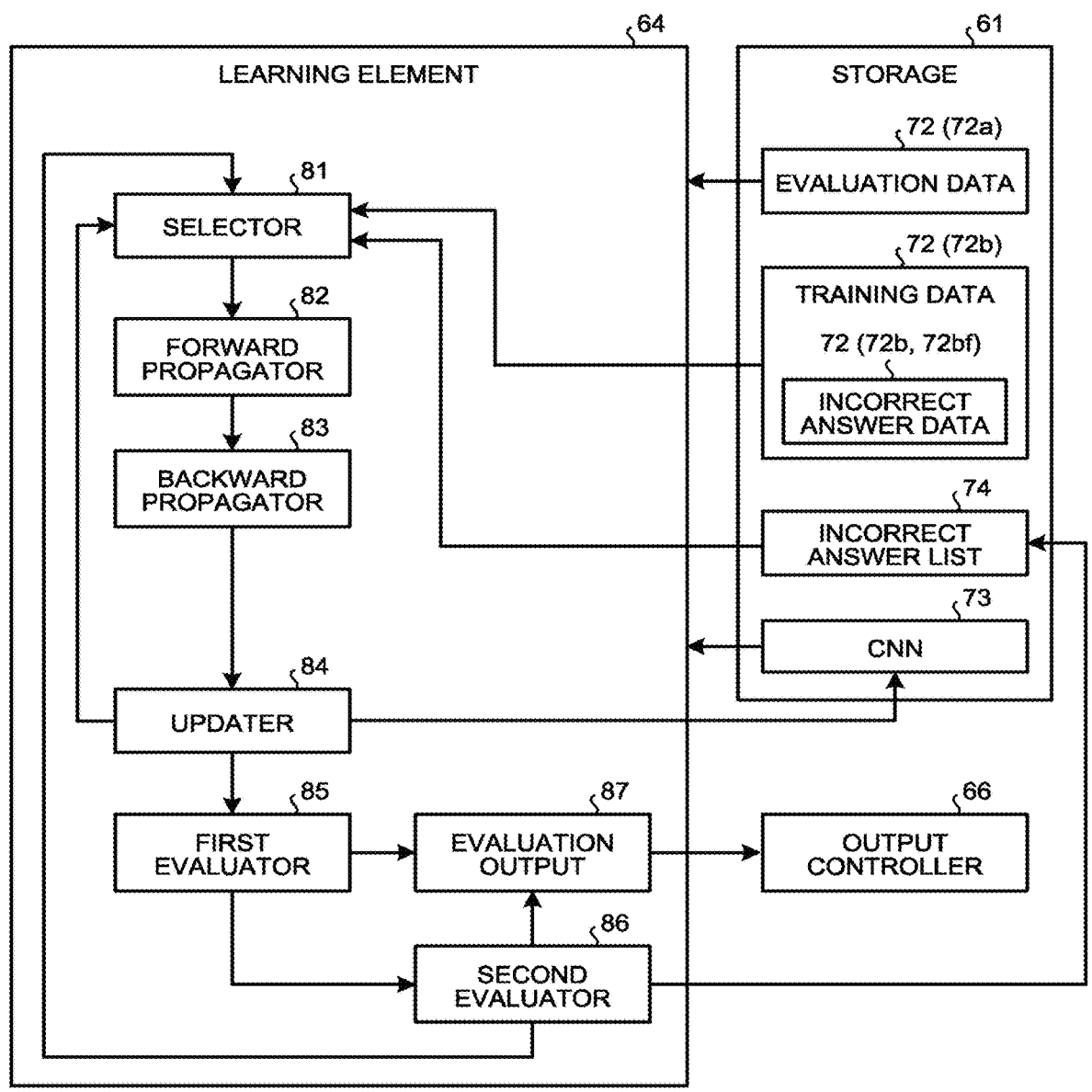
FIG. 6 is an exemplary block diagram functionally illustrating the configuration of a learning element of the first embodiment.

FIG. 6 is an exemplary block diagram illustrating the functional configuration of the learning element 64 of the first embodiment. As illustrated in FIG. 6, the learning element 64 includes a selector 81, a forward propagator 82, a backward propagator 83, an updater 84, a first evaluator 85, a second evaluator 86, and an evaluation output 87. The forward propagator 82 and the backward propagator 83 may also be referred to as computing elements. The updater 84 may also be referred to as a changer. The first evaluator 85 may also be referred to as a first determiner. The second evaluator 86 may also be referred to as a second determiner or a determiner. The evaluation output 87 may also be referred to as an output.

The selector 81 selects a given number of data sets 72 to be used for machine learning from the plurality of data sets 72. The forward propagator 82 receives the image P as input and performs the forward propagation of the CNN 73. The backward propagator 83 receives the output value Y as input and performs the backward propagation of the CNN 73. The updater 84 updates the CNN 73 based on the calculation results of the forward propagator 82 and the backward propagator 83.

The first evaluator 85 evaluates the CNN 73 based on evaluation data 72a included in the data sets 72. The second evaluator 86 evaluates the CNN 73 based on training data 72b included in the data sets 72. The evaluation output 87 outputs the evaluation results of the first evaluator 85 and the second evaluator 86.

As described above, the plurality of data sets 72 include a plurality pieces of evaluation data 72a and a plurality pieces of training data 72b. For example, the evaluation data 72a is tens to tens of thousands of data sets 72 among the plurality of data sets 72, and the training data 72b is the remaining data sets 72.

Each of the evaluation data 72a and the training data 72b includes the image P and the label L. The image P of the evaluation data 72a may also be referred to as an evaluation image. The image P of the training data 72b may also be referred to as a learning image. The image P of the training data 72b and the image P of the evaluation data 72a are included in the plurality of images P and different from each other.

Figure 7:
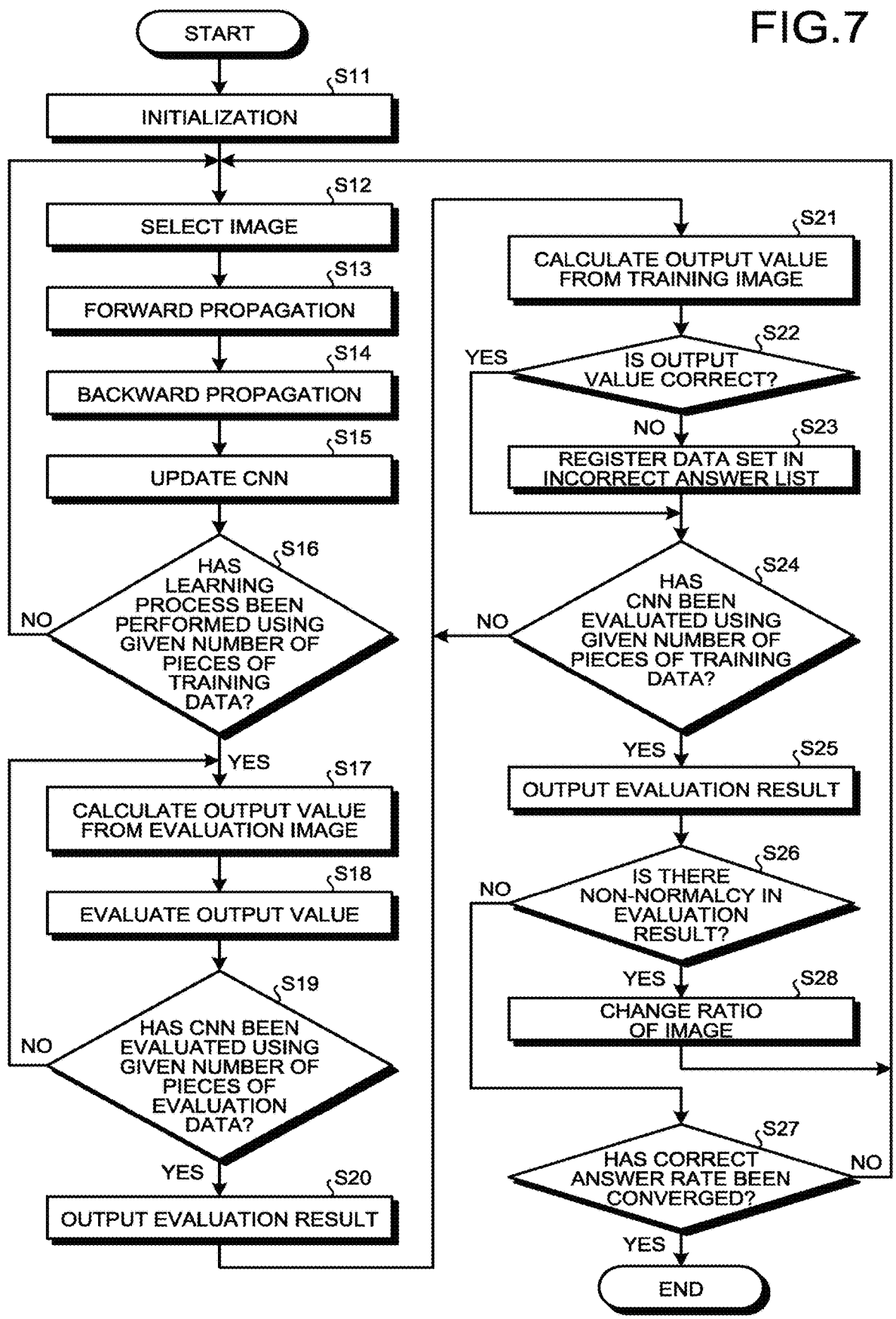
FIG. 7 is a flowchart illustrating an example of a machine learning method of the first embodiment.

FIG. 7 is a flowchart illustrating an example of the machine learning method of the first embodiment. Note that the machine learning method to be described below with reference to FIG. 7 is merely an example and the learning element 64 may perform the machine learning by another method.

In the machine learning of the learning element 64, initialization is first performed (S11). For example, the updater 84 generates a non-updated CNN 73. Note that another part of the learning element 64 may generate the non-updated CNN 73.

For example, the size of the network model (matrix) in the CNN 73 is determined from the image P and the number of nodes in a hidden layer. Therefore, the size of the matrix is designated on a computer program. Numerical values in the matrix are generated randomly, for example.

The updater 84 allows the storage 61 to store therein the generated non-updated CNN 73, for example. Note that, in the initialization, the non-updated CNN 73 previously stored in the storage 61 may be read by the learning element 64.

Next, the selector 81 selects and acquires one piece of training data 72b from the plurality of pieces of training data 72b stored in the storage 61 (S12). The selector 81 randomly selects one piece of training data 72b from the plurality of pieces of training data 72b, for example.

Next, the forward propagator 82 allows the CNN 73 to calculate an output value Y by forward propagation from the image P of the selected training data 72b (S13). Next, the backward propagator 83 calculates a gradient value from the difference between the output value Y and the label L (S14).

Next, the updater 84 updates (changes) the CNN 73 stored in the storage 61 in accordance with the gradient value by a gradient descent method (S15). In other words, the updater 84 changes the CNN 73 in accordance with the output value Y calculated by the forward propagator 82 from the image P of the training data 72b. The updater 84 may change the CNN 73 by another method. The update of the CNN 73 by the updater 84 may be expressed as generation of a new CNN 73 by the updater 84.

The operations in S12 to S15 may be referred to as a learning process. Next, the updater 84 determines whether the learning process has been performed using a given number of pieces of training data 72b (S16). When the number of pieces of learned training data 72b has not reached a given number (No at S16), the procedure returns to S12 and repeats S12 to S16.

In S16, when the number of pieces of learned training data 72b has reached the given number (Yes at S16), the first evaluator 85 calculates an output value Y by the forward propagation of the CNN 73 from the image P of a randomly selected piece of evaluation data 72a (S17). Then, the first evaluator 85 evaluates or determines whether the output value Y is correct or incorrect, based on the output value Y, calculated from the image P of the evaluation data 72a, and the label L of the evaluation data 72a corresponding to the output value Y (S18).

$y_0$, $y_1$, $y_2$ of the output value Y correspond to $l_0$, $l_1$, $l_2$ of the label L. Therefore, $y_2$ calculated by the CNN 73 having learned from the non-normal manufacturing image P3 has a value close to 1 among 0 to 1. On the other hand, $y_2$ calculated by the CNN 73 having learned from the non-manufacturing image P1 or the normal manufacturing image P2 has a value close to 0 among 0 to 1. That is, $y_2$ is linked to the probability that sparks will appear in the image P. Hereinafter, $y_2$ is referred to as spark intensity. The spark intensity $y_2$ may be represented by 0 to 1 as described above, or may be represented by 0% to 100%, for example. The CNN 73 calculates the output value Y including the spark intensity $y_2$ from the image P through the forward propagation.

The first evaluator 85 determines whether the output value Y is correct or incorrect, for example, by comparing a maximum index between the output value Y and the label L. For example, since the label L [1, 0, 0] has $l_0$=1, $l_1$=0, and $l_2$=0, the maximum index is "0" ($l_0$). Similarly, the maximum index of an output value Y [0.1, 0.1, 0.8] is "2" ($y_2$) because $y_0$=0.1, $y_1$=0.1, and $y_2$=0.8. The maximum index between the label L and the output value Y differs between "0" and "2", the first evaluator 85 determines that the output value Y is an incorrect answer.

When the label L [1, 0, 0] is compared with the output value Y [0.8, 0.1, 0.1], the maximum index of the label L is "0" ($l_0$) and the maximum index of the output value Y is "0" ($y_0$). Since the maximum indices of the output value Y and the label L are the same, the first evaluator 85 determines that the output value Y is correct.

Note that the first evaluator 85 may determine that the output value Y is correct or incorrect by another method. For example, when $l_2$ of the label L is 0, the first evaluator 85 may determine that the output value Y is incorrect if the spark intensity $y_2$ is 0.5 or more, and may determine that the output value Y is correct if the spark intensity $y_2$ is smaller than 0.5. A threshold (for example, 0.5) for determining that the output value Y is correct or incorrect may be freely set.

Next, the first evaluator 85 determines whether the CNN 73 has been evaluated using a given number of pieces of evaluation data 72a (S19). When the number of pieces of evaluation data 72a used for evaluation has not reached a given number (No at S19), the procedure returns to S17 and repeats S17 to S19.

When the number of pieces of evaluation data 72a used in evaluation matches the given number in S19 (Yes at S19), the evaluation output 87 outputs the evaluation result of the first evaluator 85 (S20). For example, the evaluation output 87 outputs a correct answer rate of the output value Y calculated by the CNN 73 from the evaluation data 72a.

Next, the second evaluator 86 calculates an output value Y by the forward propagation of the CNN 73 from the image P of the randomly selected training data 72b (S21). Then, the second evaluator 86 evaluates (determines) whether the output value Y is correct or incorrect based on the output value Y calculated from the image P of the training data 72b and the label L of the training data 72b corresponding to the output value Y (S22). As with the first evaluator 85, the second evaluator 86 determines whether the output value Y is correct or incorrect by comparing the maximum indices of the output value Y and the label L, for example.

After determining in S22 that the output value Y is incorrect (No at S22), the second evaluator 86 registers a data set 72, which corresponds to the output value Y determined to be incorrect, in the incorrect answer list 74 (S23). For example, the second evaluator 86 registers, in the incorrect answer list 74, the number (ID) of the data set 72 corresponding to the output value Y determined to be incorrect.

After determining in S22 that the output value Y is correct (Yes at S22) or completing S23, the second evaluator 86 determines whether the CNN 73 has been evaluated using a given number of pieces of training data 72b (S24). When the number of pieces of training data 72b used for evaluation matches a given number (No at S24), the second evaluator 86 returns to S21 and repeats S21 to S24.

When the number of pieces of training data 72b used for evaluation has reached the given number in S24 (Yes at S24), the evaluation output 87 outputs the evaluation result of the second evaluator 86 (S25). For example, the evaluation output 87 outputs a correct answer rate of the output value Y calculated by the CNN 73 from the training data 72b.

The evaluation output 87 outputs the evaluation result of the first evaluator 85 and the evaluation result of the second evaluator 86 to the output controller 66, for example. The output controller 66 allows the output device 14e to output a graph based on the evaluation result of the first evaluator 85 and the evaluation result of the second evaluator 86, for example.

Next, the selector 81 determines whether the evaluation result of the first evaluator 85 and the evaluation result of the second evaluator 86 include non-normalcy (S26). After determining no non-normalcy in the evaluation results (No at S26), the selector 81 determines whether the correct answer rates of the output values Y have been converged (S27).

For example, when at least one of the correct answer rate in the evaluation result of the first evaluator 85 and the correct answer rate in the evaluation result of the second evaluator 86 changes in a given range a given number of times, the selector 81 determines that the correct answer rates of the output values Y have been converged. In other words, when the evaluation results of the first evaluator 85 and the second evaluator 86 exhibit no improvement in the given number of times, the selector 81 determines that the correct answer rates of the output values Y have been converged. The present disclosure is not limited to this example and, for example, when the correct answer rates in the evaluation results of the first evaluator 85 and the second evaluator 86 exceed a threshold over a given number of times, the selector 81 may determine that the correct answer rates of the output values Y have been converged.

When the correct answer rates of the output values Y have not been converged (No at S27), the procedure returns to S12 and S12 to S26 are performed again (repeated). In S12 at the time of repetition, the selector 81 selects the training data 72b such that incorrect answer data 72bf is included at a given ratio in the given number of pieces of training data 72b used in the learning process of S12 to S15, for example.

The incorrect answer data 72bf is the training data 72b corresponding to the output value Y determined to be incorrect by the second evaluator 86 and registered in the incorrect answer list 74. The training data 72b used in the learning process includes the incorrect answer data 72bf selected from the incorrect answer list 74 and the training data 72b randomly selected from the plurality of pieces of training data 72b.

In repeating S13, the forward propagator 82 allows the CNN 73 to calculate respective output values Y from an image P of the incorrect answer data 72bf and an image P of the randomly selected training data 72b. That is, the selector 81 selects the image P of the incorrect answer data 72bf and the image P of the randomly selected training data 72b as images P to be input to the CNN 73.

The image P of the incorrect answer data 72bf is included in the plurality of images P stored in the storage 61 and corresponds to the output value Y determined to be incorrect. The image P of the incorrect answer data 72bf may also be referred to as first input information.

The image P of the randomly selected training data 72b is included in the plurality of images P stored in the storage 61 and is randomly selected from the plurality of images P. The image P of the randomly selected training data 72b may also be referred to as second input information.

Figure 8:
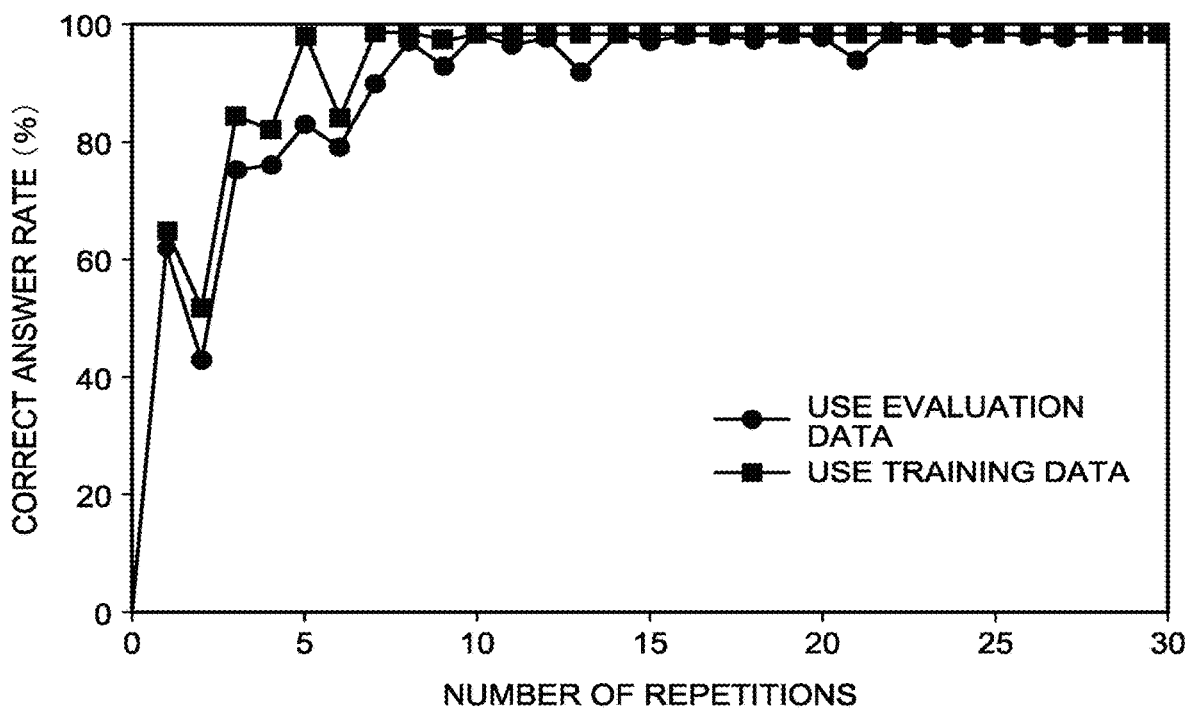
FIG. 8 is a graph illustrating an example of correct answer rates of output values in evaluation results of a first evaluator and a second evaluator of the first embodiment.
Figure 9:
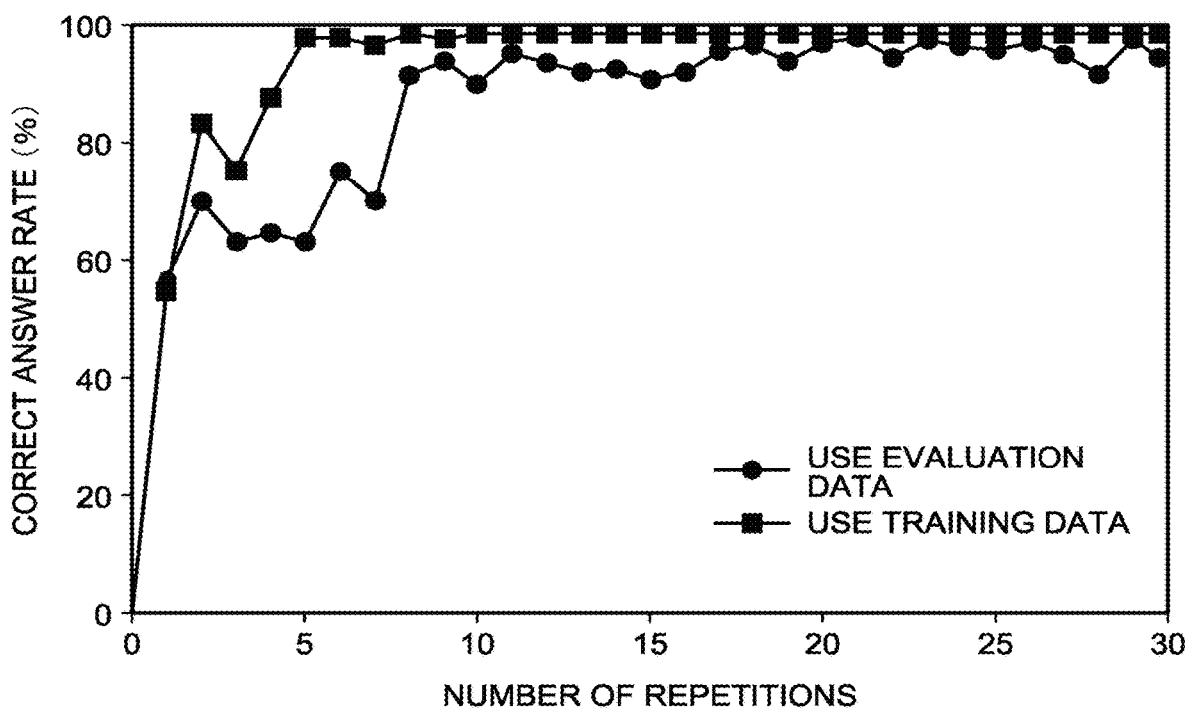
FIG. 9 is a graph illustrating an example of the correct answer rates of the output values in the evaluation results of the first evaluator and the second evaluator as a comparative example.

FIG. 8 is a graph illustrating an example of the correct answer rates of the output values Y in the evaluation results of the first evaluator 85 and the second evaluator 86 of the first embodiment. FIG. 9 is a graph illustrating an example of the correct answer rates of the output values Y in the evaluation results of the first evaluator 85 and the second evaluator 86 when the given number of pieces of training data 72b used in the learning process is all randomly selected, as a comparative example.

The graphs as illustrated in FIG. 8 and FIG. 9 are generated by the evaluation output 87, for example. FIG. 8 and FIG. 9 illustrate graphs of the correct answer rate of the output value Y in the first evaluator 85 using the evaluation data 72a and the correct answer rate of the output value Y in the second evaluator 86 using the training data 72b. In FIG. 8 and FIG. 9, a vertical axis denotes the correct answer rates of the output values Y and a horizontal axis denotes the number of repetitions of S12 to S27.

As illustrated in FIG. 8 and FIG. 9, the given number of pieces of training data 72b for use in the learning process contains the incorrect answer data 72bf at the given ratio, which enables increase in the correct answer rates of the output values Y. For example, in the present embodiment, the correct answer rate of the output value Y in the evaluation result of the first evaluator 85 is converged at 98% or more earlier than the comparative example. The ratio or the number of pieces of incorrect answer data 72bf included in the number of pieces of training data 72b used in the learning process may be freely set.

In S26 of FIG. 7, after determining occurrence of non-normalcy in the evaluation results (Yes at S26), the selector 81 changes the ratio of the incorrect answer data 72bf included in the given number of pieces of training data 72b used in the learning process of S12 to S15 (S28). In other words, based on the ratio (correct answer rate) of the output value Y determined to be correct, the selector 81 changes the ratio of the image P of the incorrect answer data 72bf and the image P of the randomly selected training data 72b, which are input to the CNN 73.

For example, a large ratio of the incorrect answer data 72bf causes overlearning. In such a case, when the number of repetitions increases, the correct answer rate may decrease. When such non-normalcy occurs in the evaluation results (correct answer rates), the selector 81 decreases the ratio of the incorrect answer data 72bf.

On the other hand, a small ratio of the incorrect answer data 72bf makes it difficult for the correct answer rates to converge irrespective of increase in the number of repetitions. When such a non-normalcy occurs in the evaluation results (correct answer rates), the selector 81 increases the ratio of the incorrect answer data 72bf. Note that the ratio or the number of pieces of incorrect answer data 72bf to be increased or decreased may be freely set.

When the selector 81 changes the ratio of the incorrect answer data 72bf in S28, the procedure returns to S12 and S12 to S28 are repeated. In S27, when the correct answer rates of the output values Y are converged (Yes at S27), the machine learning of the learning element 64 is completed. As described above, the CNN 73 is generated as the learning result of the machine learning.

Note that, in the aforementioned machine learning, the first evaluator 85 and the second evaluator 86 have evaluated the correct answer rates of the output values Y. However, the present disclosure is not limited to this example and the first evaluator 85 and the second evaluator 86 may evaluate an average loss, for example. The loss can be calculated using the cross entropy based on the output value Y and the label L.

Figure 10:
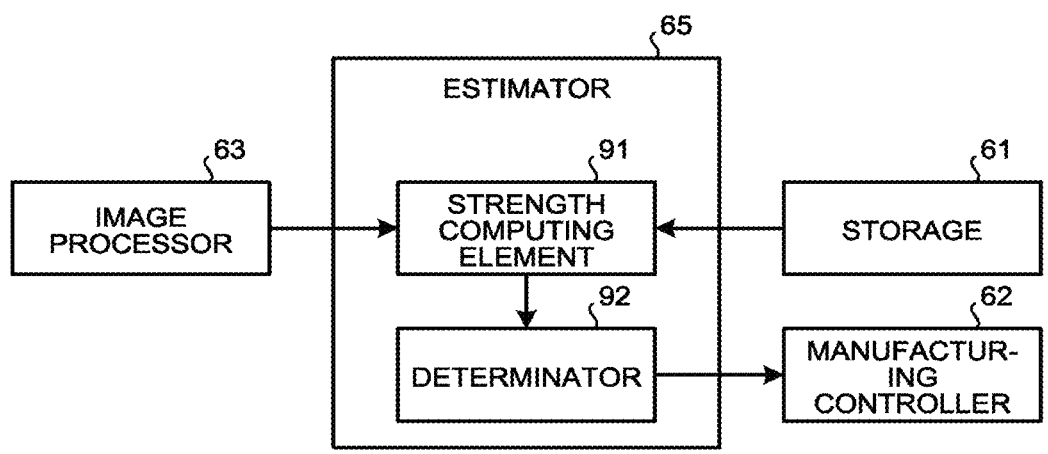
FIG. 10 is an exemplary block diagram functionally illustrating the configuration of an estimator of the first embodiment.

FIG. 10 is an exemplary block diagram functionally illustrating the configuration of the estimator 65 of the first embodiment. As illustrated in FIG. 10, the estimator 65 includes a strength computing element 91 and a determiner 92.

The strength computing element 91 acquires an image from the image processor 63, and acquires the CNN 73 from the storage 61. The CNN 73 acquired by the strength computing element 91 is the learning result generated in the machine learning by the aforementioned learning element 64. The strength computing element 91 allows the CNN 73 to calculate an output value Y by the forward propagation from the image acquired from the image processor 63.

The determiner 92 determines from the output value Y whether sparks appear in the image corresponding to the output value Y. In the present embodiment, the determiner 92 determines from the image whether additive manufacturing is stopping, additive manufacturing is normally in progress, or non-normalcy occurs in the additive manufacturing.

Figure 11:
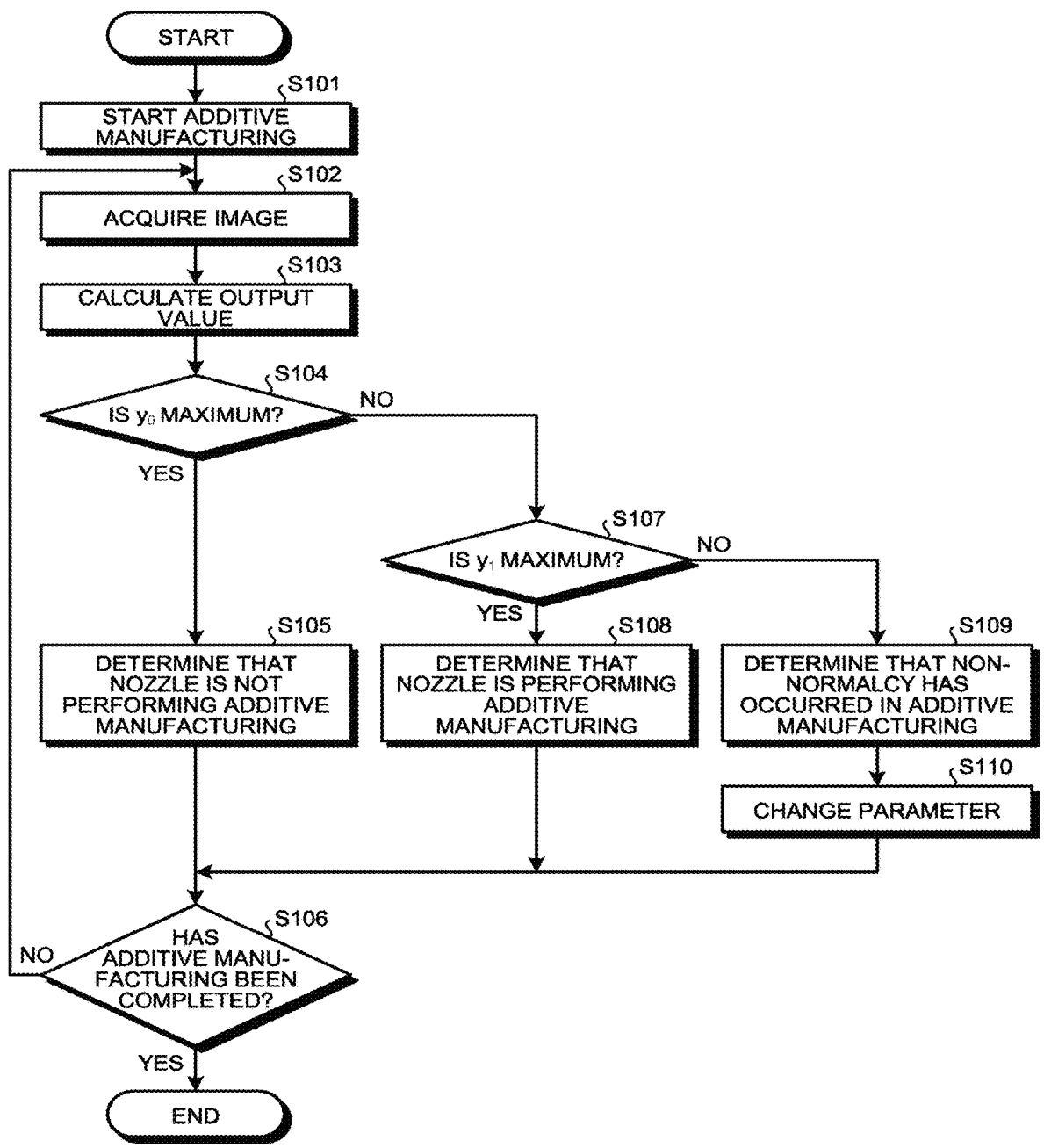
FIG. 11 is a flowchart illustrating an example of an additive manufacturing monitoring method of the first embodiment.

FIG. 11 is a flowchart illustrating an example of an additive manufacturing monitoring method of the first embodiment. Hereinafter, the monitoring of the additive manufacturing performed by the additive manufacturing system 1 will be described in detail. The additive manufacturing monitoring method to be described below with reference to FIG. 11 is merely exemplary and the additive manufacturing system 1 may monitor the additive manufacturing by another method.

As illustrated in FIG. 11, first, the manufacturing unit 12 starts the additive manufacturing by the NC program (S101). The start of the additive manufacturing in S101 corresponds to the start of the execution of the NC program 71. Thus, the nozzle 21 may not discharge the material M and not emit the energy ray E.

Next, the intensity computing element 91 acquires an image representing the nozzle 21 from the image processor (S102). Next, the intensity computing element 91 calculates an output value Y from the image by the forward propagation of the CNN 73 (S103). In other words, the intensity computing element 91 calculates the spark intensity $y_2$ from the image using the CNN 73.

Next, the determiner 92 determines whether $y_0$ is maximum among the output value Y [$y_0$, $y_1$, $y_2$] (S104). In other words, the determiner 92 determines whether the image corresponding to the output value Y is similar to the non-manufacturing image P1. When $y_0$ is maximum (Yes at S104), the determiner 92 determines that the nozzle 21 is not operating for the additive manufacturing (S105).

Next, the determiner 92 determines whether the additive manufacturing has been completed (S106). When the additive manufacturing has not been completed (No at S106), the procedure returns to S102 and the intensity computing element 91 acquires a next image from the image processor 63.

When $y_0$ is not maximum in S104 (No at S104), the determiner 92 determines whether $y_1$ is maximum in the output value Y [$y_0$, $y_1$, $y_2$] (S107). In other words, the determiner 92 determines whether the image corresponding to the output value Y is similar to the normal manufacturing image P2. When $y_1$ is maximum (Yes at S107), the determiner 92 determines that the nozzle 21 is normally operating for additive manufacturing (S108) and the procedure proceeds to S106.

When $y_1$ is not maximum in S107 (No at S107), the spark intensity $y_2$ is maximum in the output value Y [$y_0$, $y_1$, $y_2$]. Therefore, the image corresponding to the output value Y is similar to the non-normal manufacturing image P3 and it is highly possible that sparks has been generated.

When the spark intensity $y_2$ is maximum, the determiner 92 determines that non-normalcy has occurred in the additive manufacturing (S109). In such a case, the manufacturing controller 62 changes the additive manufacturing parameters (S110) and proceeds to S106.

For example, according to the spark intensity $y_2$, the manufacturing controller 62 changes at least one of the flow rate of the inert gas to supply to the chamber C, the flow rate of the shield gas G to discharge from the nozzle 21, the output of the energy ray E from the nozzle 21, the speed of the nozzle 21, and the discharge amount of the material M from the nozzle 21, thereby reducing the occurrence of sparks and inhibiting the oxidation of the material M. The amount of change in the parameters by the manufacturing controller 62 may be constant or may be linked to the spark intensity. With a change in the speed of the nozzle 21 or the discharge amount of the material M, the manufacturing controller 62 adjusts the additive manufacturing parameters such that the height of the molten region 3a is to be substantially constant.

After completion of the additive manufacturing in S106 (Yes at S106), the additive manufacturing system 1 completes monitoring the additive manufacturing. As described above, the additive manufacturing system 1 monitors the occurrence of sparks during the additive manufacturing. In response to occurrence of sparks in the additive manufacturing, the manufacturing controller 62 changes the additive manufacturing parameters to reduce the sparks.

In monitoring the additive manufacturing, after determining $y_1$ as not maximum in S107, the additive manufacturing system 1 determines non-normalcy in the additive manufacturing. However, the present disclosure is not limited to this example and the additive manufacturing system 1 may determine non-normalcy in the additive manufacturing, for example, when the spark intensity $y_2$ is found maximum a given number of times or when the spark intensity $y_2$ integrated a given number of times exceeds a threshold.

The determiner 92 may output the determination result to the output controller 66, for example, in association with the coordinates of the nozzle 21. Based on the determination result, it is possible to obtain a record (log) of the state of the additive manufacturing at each set of coordinates of the nozzle 21.

In the additive manufacturing system 1 according to the first embodiment described above, the learning element 64 performs machine learning based on the plurality of images P representing the nozzle 21, which discharges the material M of the object 3 and melts or sinters the material M by emitting the energy ray E to the material M, and the label L indicating whether sparks appear in the plurality of images P, thereby generating the CNN 73. The estimator 65 estimates appearance or non-appearance of sparks in the images P from the CNN 73 and the image generated by the imager 13. Occurrence of sparks during the melting or sintering of the material M such as titanium may indicate oxidization of the material M. The additive manufacturing system 1 can automate the spark monitoring based on results of the estimation by the estimator 65, and prevent the object 3 from becoming fragile due to the oxidized material M.

For example, a light amount sensor can serve to monitor the occurrence of sparks instead of a calculator such as the CNN 73 to be updated by machine learning. However, such a sensor may erroneously sense light emission in normal additive manufacturing as sparks. The additive manufacturing system 1 of the present embodiment employs the calculator such as the CNN 73 to be updated by machine learning and can thereby improve the accuracy of monitoring the occurrence of sparks.

In the present embodiment the material M includes titanium. As described above, occurrence of sparks during the melting or sintering of the material M such as titanium may indicate oxidization of the material M. The additive manufacturing system 1 can thus automate the spark monitoring based on the estimation result of the estimator 65, and can prevent the object 3 from becoming fragile due to the oxidized titanium.

The estimator 65 uses the CNN 73 to calculate, from the image generated by the imager 13, the spark intensity $y_2$ linked to the probability that sparks appear in the image. Since the estimator 65 calculates a numerical value (spark intensity $y_2$), the additive manufacturing system 1 perform various types of control in accordance with the numerical value.

The manufacturing controller 62 changes the additive manufacturing parameters for the manufacturing unit 12 in accordance with the spark intensity $y_2$. For example, based on the spark intensity $y_2$, the manufacturing controller 62 controls at least one of the flow rate of the inert gas supplied to the chamber C for the additive manufacturing, the flow rate of the shield gas G to discharge from the nozzle 21, the output of the energy ray E from the nozzle 21, the speed of the nozzle 21, and the discharge amount of the material M from the nozzle 21, thereby reducing the occurrence of sparks and inhibiting the oxidation of the material M. This can prevent the object 3 from becoming fragile due to the oxidized material M.

With reference to the label L and the output value Y calculated by the forward propagator 82 from the image P of the evaluation data 72a, the first evaluator 85 determines whether the output value Y is correct or incorrect. The second evaluator 86 determines whether the output value Y is correct or incorrect with reference to the label L and the output value Y calculated by the forward propagator 82 from the image P of the training data 72b different from the image P of the evaluation data 72a. The evaluation output 87 outputs results of the evaluation by the first evaluator 85 and the second evaluator 86. Thereby, the additive manufacturing system 1 enables an evaluation of the accuracy of the CNN 73 generated by the machine learning from the determination result of the second evaluator 86. Moreover, the additive manufacturing system 1 enables an evaluation of the accuracy of the CNN 73 as to the image P of the evaluation data 72a unused in the machine learning from the determination result of the first evaluator 85. That is, the additive manufacturing system 1 can improve in accuracy of monitoring the occurrence of sparks, and prevent the object 3 from becoming fragile due to the oxidized material M.

The CNN 73 calculates respective output values Y from an image P of the incorrect answer data 72bf and another image P of the plurality of images P. The image P of the incorrect answer data 72bf corresponds to the output value Y determined to be incorrect, among the plurality of images P. The CNN 73 is changed based on the output value Y. That is, the CNN 73 performs the machine learning using the image P which has caused an incorrect determination at least once. In this way, the CNN 73 can improve in accuracy of calculating the output value Y, shortening a length of machine learning time (number of repetitions).

The plurality of images P may include the non-manufacturing image P1, the normal manufacturing image P2, and the non-normal manufacturing image P3 in a non-uniform manner. In the present embodiment, the CNN 73 performs the machine learning using the image P which has caused an incorrect determination at least once, therefore, the CNN 73 can attain a learning effect close to the one in the case of the plurality of images P including the images P1 to P3 in a uniform manner.

The CNN 73 calculates respective output values Y from an image P of the incorrect answer data 72bf at an appropriate ratio and an image P randomly selected from the plurality of images P. This can reduce unbalance of images P to be input to the CNN 73. That is, the CNN 73 can improve in accuracy of calculating the output value Y, shortening a length of machine learning time (number of repetitions).

Based on the ratio of output values Y determined to be correct, the ratio of images P of the incorrect answer data 72bf to be input to the CNN 73 is changed. While the CNN 73 is overlearning, the ratio of the images P of the incorrect answer data 72bf is decreased, and while the ratio of the output values Y determined to be correct delays in converging, the ratio of the images P of the incorrect answer data 72bf is increased, for example. Thereby, the CNN 73 can improve in accuracy of calculating the output value Y, shortening a length of machine learning time (number of repetitions).

The computer program executed by the control unit 14 of the present embodiment is recorded and provided in an installable or executable file format on a computer readable recording medium, such as a CD-ROM, a floppy disk (FD), a CD-R, and a digital versatile disc (DVD).

Furthermore, the computer program executed by the control unit 14 of the present embodiment may be configured to be stored on a computer connected to a network such as the Internet and provided by being downloaded via the network. The computer program executed by the control unit 14 of the present embodiment may be configured to be provided or distributed via the network such as the Internet.

Furthermore, the computer program of the present embodiment may be configured to be incorporated in advance in a ROM, for example.

The computer program executed by the control unit 14 of the present embodiment has a module configuration including the respective elements (the manufacturing controller 62, the image processor 63, the learning element 64, the estimator 65, and the output controller 66). The CPU or one or more processors serve as actual hardware to read and execute the computer program from the recording medium to load and generate the manufacturing controller 62, the image processor 63, the learning element 64, the estimator 65, and the output controller 66 on a main storage.

Second Embodiment

Hereinafter, a second embodiment will be described with reference to FIG. 12. Note that, in describing the following embodiment, components having the same functions as those of the components already described are denoted by the same reference numerals as those of the components already described, and a description thereof may be omitted. Furthermore, a plurality of components denoted by the same reference numerals do not necessarily have all functions and properties in common and may have functions and properties different according to each embodiment.

Figure 12:
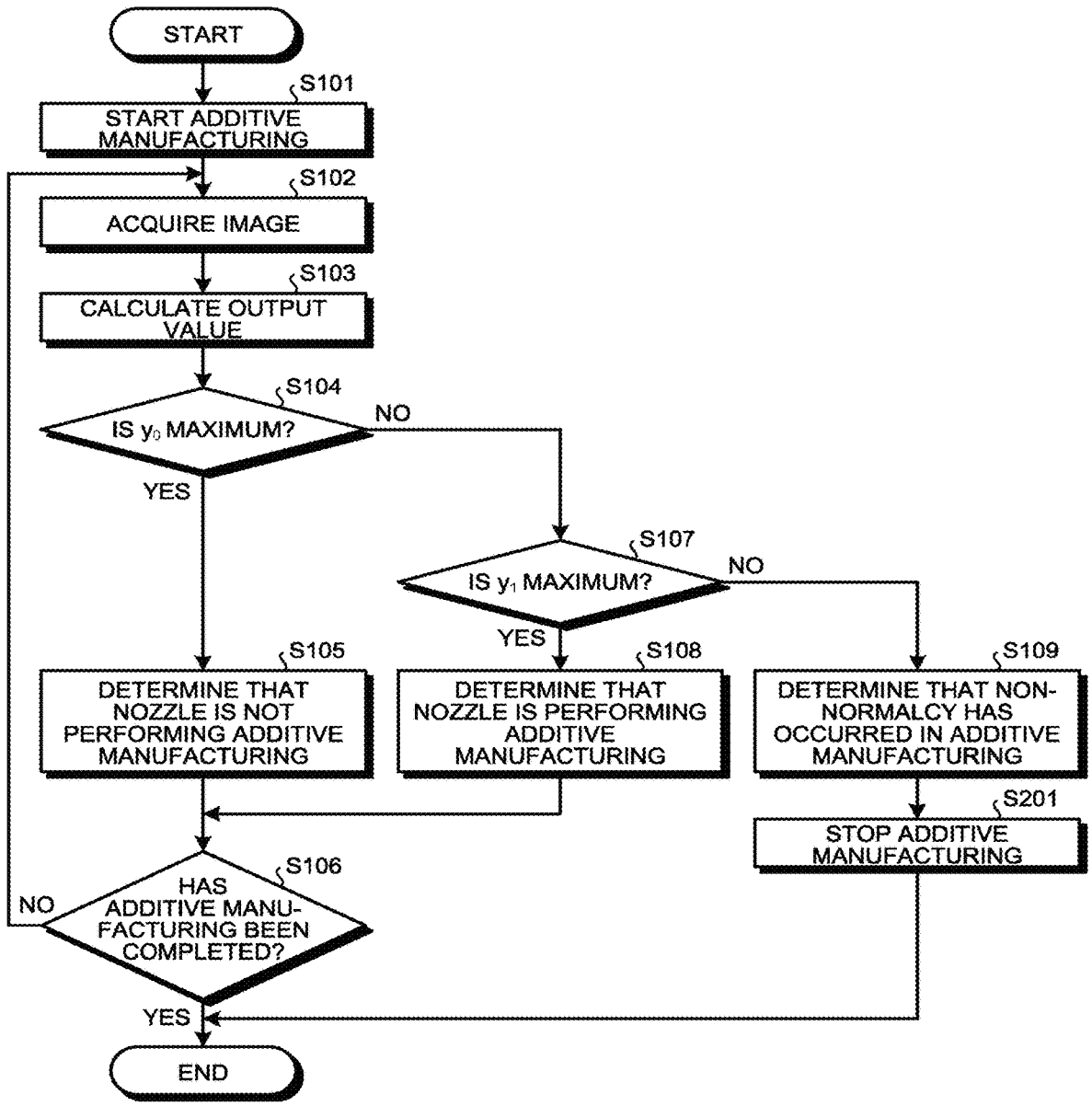
FIG. 12 is a flowchart illustrating an example of an additive manufacturing monitoring method according to a second embodiment.

FIG. 12 is a flowchart illustrating an example of an additive manufacturing monitoring method according to the second embodiment. As illustrated in FIG. 12, in the second embodiment, after S109, the manufacturing controller 62 stops the additive manufacturing (S201) instead of changing the additive manufacturing parameters, and the additive manufacturing system completes monitoring the additive manufacturing. That is, the manufacturing controller 62 stops the manufacturing unit 12 with reference to the spark intensity $y_2$.

In the additive manufacturing system 1 of the second embodiment described above, the manufacturing controller 62 can stop the operation of the manufacturing unit 12 with reference to the spark intensity $y_2$. That is, if the material M may become oxidized, the manufacturing controller 62 can stop the additive manufacturing, preventing the object 3 from becoming fragile due to oxidized material M.

The determiner 92 outputs a determination result to the output controller 66. Therefore, the additive manufacturing system 1 can facilitate specifying a possible oxidized location of the material M from a record (log) of the determination result. The additive manufacturing system 1 can thus remove the possible oxidized location of the material M, and restart the additive manufacturing.

In at least the embodiments described above, the control unit 14 includes the storage 61, the learning element 64, and the estimator 65. However, a device or a system different from the additive manufacturing system 1 may include, for example, at least one of the storage 61, the learning element 64, and the estimator 65.

Furthermore, the above embodiments have described the example of applying the machine learning method performed by the learning element 64 to an image recognition for estimating appearance or non-appearance of sparks in the image P. However, the machine learning method performed by the learning element 64 may be applied to another technology such as another image recognition, voice or speech recognition, and natural language processing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A machine learning method to determine an operation of an additive manufacturing apparatus, the method to be executed by a computer, the method comprising:
    causing a calculator to calculate output information from each of items of input information;
    determining on the basis of the output information and answer information whether the output information is correct or incorrect, the answer information being set to each of the items of input information;
    changing a ratio of first input information and second input information to be input to the calculator, in accordance with a ratio of the output information determined to be correct, the first input information and the second input information being included in the items of input information, the first input information corresponding to the output information determined to be incorrect;
    causing a selector to select the output information from each of the first input information and the second input information;
    changing the calculator based on the output information; and
    causing the additive manufacturing apparatus to stop the additive manufacturing in accordance with the output information, while the additive manufacturing apparatus additively manufactures an object.

2. The machine learning method according to claim 1, wherein the second input information is randomly selected from the items of input information.

3. The machine learning method according to claim 1, wherein the calculator serves as a neural network.

4. The machine learning method according to claim 1, wherein the calculator is changed in accordance with a gradient value calculated based on the output information and the answer information.

5. An information processing device to determine an operation of an additive manufacturing apparatus, the information processing device comprising:
    one or more processors that function as:
    a calculator that calculates output information from each of items of input information;
    a determiner that determines on the basis of the output information and answer information whether the output information is correct or incorrect, the answer information being set to each of the items of input information;
    a changer that changes a ratio of first input information and second input information to be input to the calculator, in accordance with a ratio of the output information determined to be correct, the first input information and the second input information being included in the items of input information, the first input information corresponding to the output information determined to be incorrect;
    a selector that selects the output information from each of the first input information and the second input information;
    a changer that changes the calculator based on the output information; and
    a manufacturing controller that causes the additive manufacturing apparatus to stop the additive manufacturing in accordance with the output information, while the additive manufacturing apparatus additively manufactures an object.

6. The information processing device according to claim 5, further comprising:
    an imager that generates an image of a nozzle, the nozzle being included in the additive manufacturing apparatus, the nozzle that discharges a powdered material to additively manufacture the object and melts or sinters the material by emitting an energy ray to the material, wherein the one or more processors function as:
    a learning element including the determiner, the selector, and the changer; and
    an estimator, the learning element performs machine learning based on a plurality of first images representing the nozzle and spark information indicating whether sparks appear in the plurality of first images, and generates the calculator as a result of the learning, the imager generates a second image of the nozzle; and
    the estimator estimates appearance or non-appearance of sparks in the second image from the second image and the generated calculator.

7. The information processing device according to claim 6, wherein the material includes a titanium.

8. The information processing device according to claim 6, wherein the estimator uses the generated calculator to calculate a spark intensity from the second image, the spark intensity linked to a probability that sparks appear in the second image.

9. An additive manufacturing monitoring system comprising:
the information processing device according to claim 8; and
the additive manufacturing apparatus that comprises the nozzle, discharges the material from the nozzle, and melts or sinters the material with the energy ray emitted from the nozzle, to additively manufacture the object, wherein
the manufacturing controller is able to stop the additive manufacturing according to the spark intensity.

10. The information processing device according to claim 6, wherein the learning element comprises:
a computing element that uses the calculator to calculate the output information from each of the plurality of first images;
a first determiner that determines whether the output information is correct or incorrect, on the basis of the spark information, and the output information calculated by the computing element from an evaluation image of the plurality of first images;
a second determiner that determines whether the output information is correct or incorrect, on the basis of the spark information, and the output information calculated by the computing element from a training image of the plurality of first images, the training image different from the evaluation image; and
an output that outputs a result of the determination by the first determiner and a result of the determination by the second determiner, and
the changer changes the calculator according to the output information calculated by the computing element from the learning image.

11. A computer program product including programmed instructions to determine an operation of an additive manufacturing apparatus, the instructions embodied in and stored on a non-transitory computer readable medium, wherein the instructions, when executed by a computer, cause the computer to perform:
causing a calculator to calculate output information from each of items of input information;
determining on the basis of the output information and answer information whether the output information is correct or incorrect, the answer information being set to each of the items of input information;
changing a ratio of first input information and second input information to be input to the calculator, in accordance with a ratio of the output information determined to be correct, the first input information and the second input information being included in the items of input information, the first input information corresponding to the output information determined to be incorrect;
selecting the output information from each of the first input information and the second input information;
changing the calculator based on the output information; and
causing the additive manufacturing apparatus to stop the additive manufacturing in accordance with the output information, while the additive manufacturing apparatus additively manufactures an object.

* * * * *